(12) United States Patent
Dome et al.

(10) Patent No.: US 11,539,581 B2
(45) Date of Patent: Dec. 27, 2022

(54) AUTONOMOUS CLOUD DESIGN AND CONTROL

(71) Applicant: AT&T Intellectual Property I, L.P., Atlanta, GA (US)

(72) Inventors: George Dome, Tinton Falls, NJ (US); John Oetting, Zionsville, PA (US); Chuxin Chen, San Francisco, CA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 117 days.

(21) Appl. No.: 16/113,826

(22) Filed: Aug. 27, 2018

(65) Prior Publication Data

US 2020/0067768 A1    Feb. 27, 2020

(51) Int. Cl.
    *G06F 15/16*       (2006.01)
    *H04L 41/0806*     (2022.01)
    *G06T 17/00*       (2006.01)
    *G06T 19/00*       (2011.01)

(52) U.S. Cl.
    CPC .......... *H04L 41/0806* (2013.01); *G06T 17/00* (2013.01); *G06T 19/006* (2013.01)

(58) Field of Classification Search
    CPC .... H04L 41/0806; G06T 17/00; G06T 19/006
    USPC ....................................................... 709/220
    See application file for complete search history.

(56) References Cited

U.S. PATENT DOCUMENTS

| | | | |
|---|---|---|---|
| 5,831,610 A * | 11/1998 | Tonelli | H04L 41/145 715/839 |
| 7,978,629 B2 | 7/2011 | Resende et al. | |
| 8,660,067 B2 | 2/2014 | Hajiaghayi | |
| 8,775,648 B1 | 7/2014 | Cassidy et al. | |
| 9,154,589 B1 | 10/2015 | Klein et al. | |
| 9,253,252 B2 | 2/2016 | Agarwal et al. | |
| 9,898,342 B2 | 2/2018 | Carter | |
| 9,967,350 B2 | 5/2018 | Rao | |
| 10,425,832 B1 * | 9/2019 | Zawadzki | H04L 41/12 |
| 2007/0168923 A1 * | 7/2007 | Connor | G06F 30/00 717/104 |
| 2009/0243517 A1 * | 10/2009 | Verfuerth | H05B 47/16 315/315 |
| 2012/0218917 A1 * | 8/2012 | Komarevtsen | H04L 41/0843 370/254 |
| 2014/0313542 A1 | 10/2014 | Benchorin et al. | |
| 2015/0149392 A1 * | 5/2015 | Bolich | G06N 5/02 706/11 |

(Continued)

FOREIGN PATENT DOCUMENTS

WO    WO 2016/178015 A1    11/2016
WO    WO 2017/100640 A1    6/2017

OTHER PUBLICATIONS

"Intel® Cloud Builders Guide: Cloud Design and Deployment on Intel® Platforms"; Intel Cloud Builders Guide; Jun. 2018; 31 pages.

(Continued)

*Primary Examiner* — Dustin Nguyen
*Assistant Examiner* — Joel Mesa
(74) *Attorney, Agent, or Firm* — Guntin & Gust, PLC; Jay H. Anderson

(57) ABSTRACT

The autonomous cloud design system may determine a design that may appropriately mix emerging technologies and operations to provide a versatile and cost-effective or efficient solution for a given cloud site.

20 Claims, 12 Drawing Sheets

(56) References Cited

U.S. PATENT DOCUMENTS

2015/0312134 A1* 10/2015 Kapadia ................. H04L 12/44
                                                                    370/255
2017/0195187 A1*  7/2017 Bennett ............... H04L 41/0813
2017/0289060 A1  10/2017 Aftab et al.
2018/0069751 A1   3/2018 Guo et al.

OTHER PUBLICATIONS

Katsalis et al.; "5G Architectural Design Patterns"; IEEE Int'l Conf. on Communications Workshops; 2016; 6 pages.

* cited by examiner large, medium, or small. These basic designs, (aka, cookie-cutter approach), are simple to cost and create a design layout manually or with minimal system tooling. With the wave of possible new technology, operation, and infrastructure approaches on the horizon, the problem of choosing optimal design approach for life-cycle cost will become exceedingly more complex. The number of new permutations of power, connectivity, robotics and infrastructure designs may overwhelm conventional approaches.

AUTONOMOUS CLOUD DESIGN AND CONTROL

BACKGROUND

Today's cloud designs are template driven based on category of cloud such as large, medium, or small. These basic designs, (aka, cookie-cutter approach), are simple to cost and create a design layout manually or with minimal system tooling. With the wave of possible new technology, operation, and infrastructure approaches on the horizon, the problem of choosing optimal design approach for life-cycle cost will become exceedingly more complex. The number of new permutations of power, connectivity, robotics and infrastructure designs may overwhelm conventional approaches.

SUMMARY

Disclosed herein is an autonomous cloud design system. The autonomous cloud design system may determine a design that may appropriately mix emerging technologies and operations to provide a versatile and cost-effective or efficient solution for a given cloud site. In the future, options for cloud configurations and operation models may undergo a significant change that may transform existing cloud implementations and make radical new designs for sites. This may be particularly significant for edge cloud sites that may number in the thousands to millions of locations. As opposed to manual or simple excel approaches, the autonomous cloud design system may include several different logical components.

In an example, an apparatus may include a processor and a memory coupled with the processor that effectuates operations. The operations may include obtaining a network design template; obtaining space and power constraints of a site; based on the network design template, space constraints, and power constraints, creating a plurality of candidate site designs; based on a first site design of the plurality of candidate site designs being within a threshold estimated performance, selecting the first site design; and sending instructions to automatically implement the first site design.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

Reference will now be made to the accompanying drawings, which are not necessarily drawn to scale.

DETAILED DESCRIPTION

Figure 1:
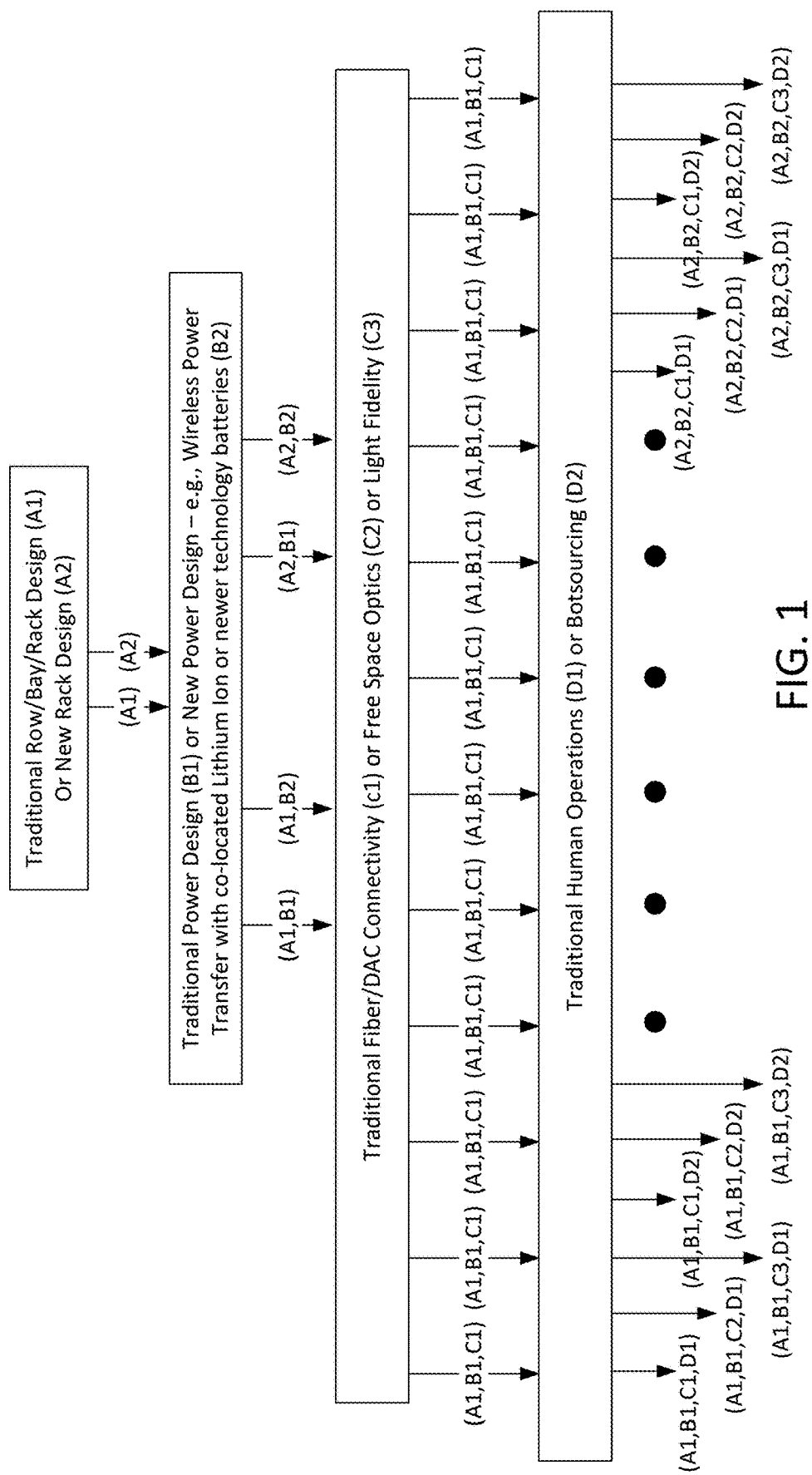
FIG. 1 illustrates exemplary design approaches.

The autonomous cloud design system provides a powerful approach to deal with the future diversity of approaches and yield low total cost of operation, maintenance, or ownership. The autonomous cloud design system may provide designs options and recommendations as a horizon technology and approach (e.g. operation or infrastructure) options reach near or full maturity (e.g., pass through Gartner's Slope of Disillusionment, towards Scope of Enlightenment, and into the Plateau of Productivity). For instances, FIG. 1 shows 24 different design approaches are possible based on a simplified view of Traditional Row/Bay/Rack Design (A1) or New Rack Design (A2), Traditional Power Design (B1) or New Power Design (e.g., Wireless Power Transfer with co-located Lithium Ion or newer technology batteries (B2)), Traditional Fiber/DAC Connectivity (C1) or Free Space Optics (C2) or Light Fidelity (C3), Traditional Human Operations (D1) or Botsourcing (D2).

Figure 2:
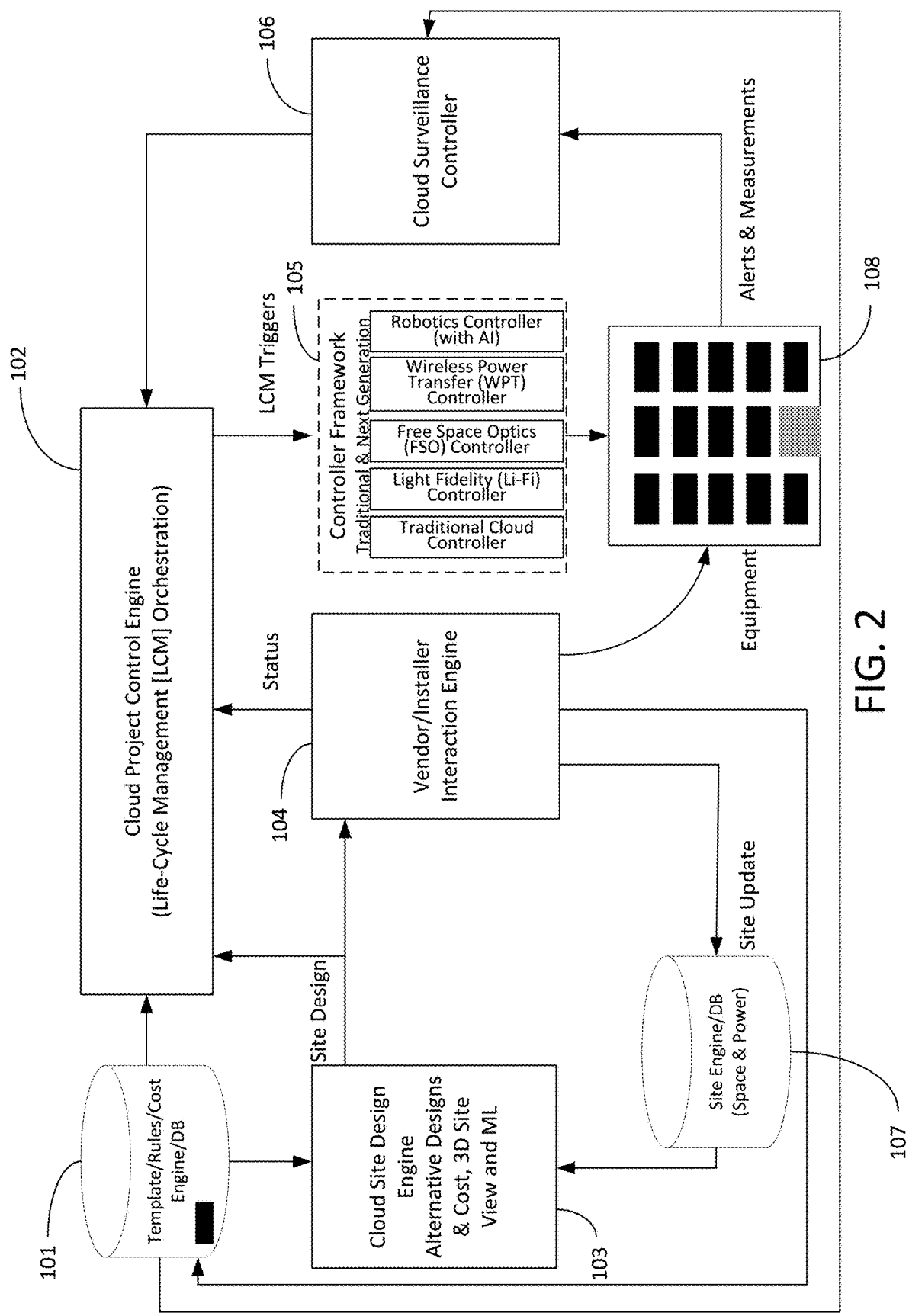
FIG. 2 illustrates exemplary components of an autonomous cloud design system.

FIG. 2 illustrates exemplary components of autonomous cloud design system 100. System 100 may include cloud site design engine 103 with inputs from a templates engine 101 (e.g., Templates, Rules, or Cost) and site engine 107, vendor engine 104 (e.g., vender or installer interaction) that provides feedback on the actual cost provided by vendors or installers. The actual cost may be considered the cost for services (e.g., hourly wages to install the equipment) for implementing a specific site design. Cloud project control engine 102 may drive controller framework 105 (e.g., Traditional Cloud, Free Space Optics Controller, Light Fidelity Controller, Wireless Power Transfer Controller, or Robotics Controller) and cloud surveillance controller 106.

With continued reference to FIG. 2, cloud site design engine 103 may provide 1) alternative designs and cost for a site—new or augment to an existing site, 2) design and cost to re-configure a site to next generation cloud design and control, 3) virtual reality view of site based on a selected alternative, 4) machine learning to improve the accuracy of the various design options based on previous site installation and technology cost trends, as well recommend the optimal solution among the various design options, or 5) once a site plan is selected, send the site design to the vendor engine 104, updates to the site engine 107, and project to the cloud project control engine. Based on a certain triggers, as disclosed in more detail herein, cloud site design engine 103 may select the site to be analyzed, generate alternative site designs, which may include cost projections, generate three dimensional site design output for use with virtual reality (VR) or augmented reality (AR) in order to review the proposed physical and logical site design, or trigger an automated site build plan.

Template engine 101 may provide: 1) Cloud Design and Control CRUD (Create, Read, Update, and Delete) for template and cost (e.g., traditional design templates, FSO, Li-Fi, WPT, Battery Type, Robotic (incl. Track), etc.; or 2) provide the templates and costs to cloud site design engine 103, as requested. Template engine 101 may be updated based on certain triggers (e.g., periodically) and create new CRUD technology design and cost templates. Template 101 may obtain a catalog to construct and maintain cloud environment and cost, and definitions of anomalies and appropriate actions. Example anomalies may be a failure or performance degradation of the cloud (e.g., server failure) or cloud infrastructure components (e.g., wireless power transfer unit failure). And the appropriate actions may be a policy for a closed loop control to resolve the fault(s), such as a based on the failure a particularly (e.g., different) sequential powering off (or restarting) of certain routers, switches, or other devices that may be connected with the server or the wireless power transfer unit. Site engine 107 may provide 1) 3D Space Layout (available, used, reserved, cleanable, etc.), 2) Power available (site, floor, etc.), or 3) any constraints. The template engine 101 may provide the specifications for various cloud office e.g. large, medium, and small complexes. Small configurations (e.g. unicycle) may describe a 1 bay cloud configuration. Medium configuration (e.g. tricycle) may describe a 3 bay cloud configuration. Large configuration (e.g. Cruiser) may include six racks. For the large configuration example, the first two racks may hold redundant pairs of R-Leaf, Spine, Agg Leaf and management switches. The remaining 4 Racks may include compute and control server nodes, management switches and a pair of C-Leaf that are spread across the first two racks. The site engine 107 may have the specific infrastructure details about a given site (e.g. data center, central office, MTSO (Mobile Telephone/Telecommunications Switching Office), or cell site). Infrastructure may include the existing use of floor space, such as rack lineups and their usage, power availability, availability (e.g., in disrepair or not), etc.

Template engine 101 may have approved and tested golden configuration layouts. The network design template (e.g., a cloud design template) may be created by a subject matter expert (SME). As new sites or augments to sites are required, the system may automatically select the appropriate template and automate the site design.

With continued reference to FIG. 2, vendor engine 104 may provide: 1) vendor selection, order and payment; 2) Installer quote, selection, order and payment; 3) actual cost; or 4) installation and equipment status to cloud project control engine 102. The equipment vendor interactions with the vendor interaction engine may provide equipment ship status and to receive payment. Also, vendor engine 104 may provide an installation quote, status, and payment. This vendor engine 104 may be an external engine that a vendor or installer may periodically update. Vendor engine 104 may provide an approved list of vendors (or installers) to order the equipment specified in the template for a given site or perform the rack and stack of the equipment and cabling a given site, or the like installation needs.

Cloud project control engine 102 may: 1) provide as required for certain designs and conditions to the controllers (FSO, LI-Fi, WPT, Robotics), and 2) receive status from cloud surveillance controller 106 and perform control changes. Cloud project control engine 102 may also: 1) manage the delivery, modification, or removal of cloud resources using controller framework 105; or 2) provide cross domain orchestration to optimize the utilization of resources or take broad corrective action (e.g., FSO and WPT).

Cloud surveillance controller 106 may provide: 1) cloud state changes, and 2) cloud status. Cloud surveillance controller 106 may interact with equipment 108 or other devices to provide status, alert of issues, and ability to re-configure the cloud. Cloud surveillance controller 106 may also: 1) monitor cloud performance, including traditional power, traditional connectivity, FSO, Light Fidelity (Li-Fi), WPT, new battery types, and robotics; or 2) trigger cloud project control engine 102 to take actions (e.g., correct positioning of a bay).

Controller framework 105 may include traditional and next generation controllers, such as robotics controller (with AI), WPT Controller, FSO Controller, Li-Fi Controller, or other controller. Controller framework 105 may also: 1) instantiate, configure, or manage the lifecycle of infrastructure networking and power; 2) instantiate, configure, or manage the lifecycle of infrastructure (compute, storage, etc.); or 3) provide Various Next Generation Technology Controllers. Controllers may be co-located at the site or centrally located to support multiple sites.

Figure 3:
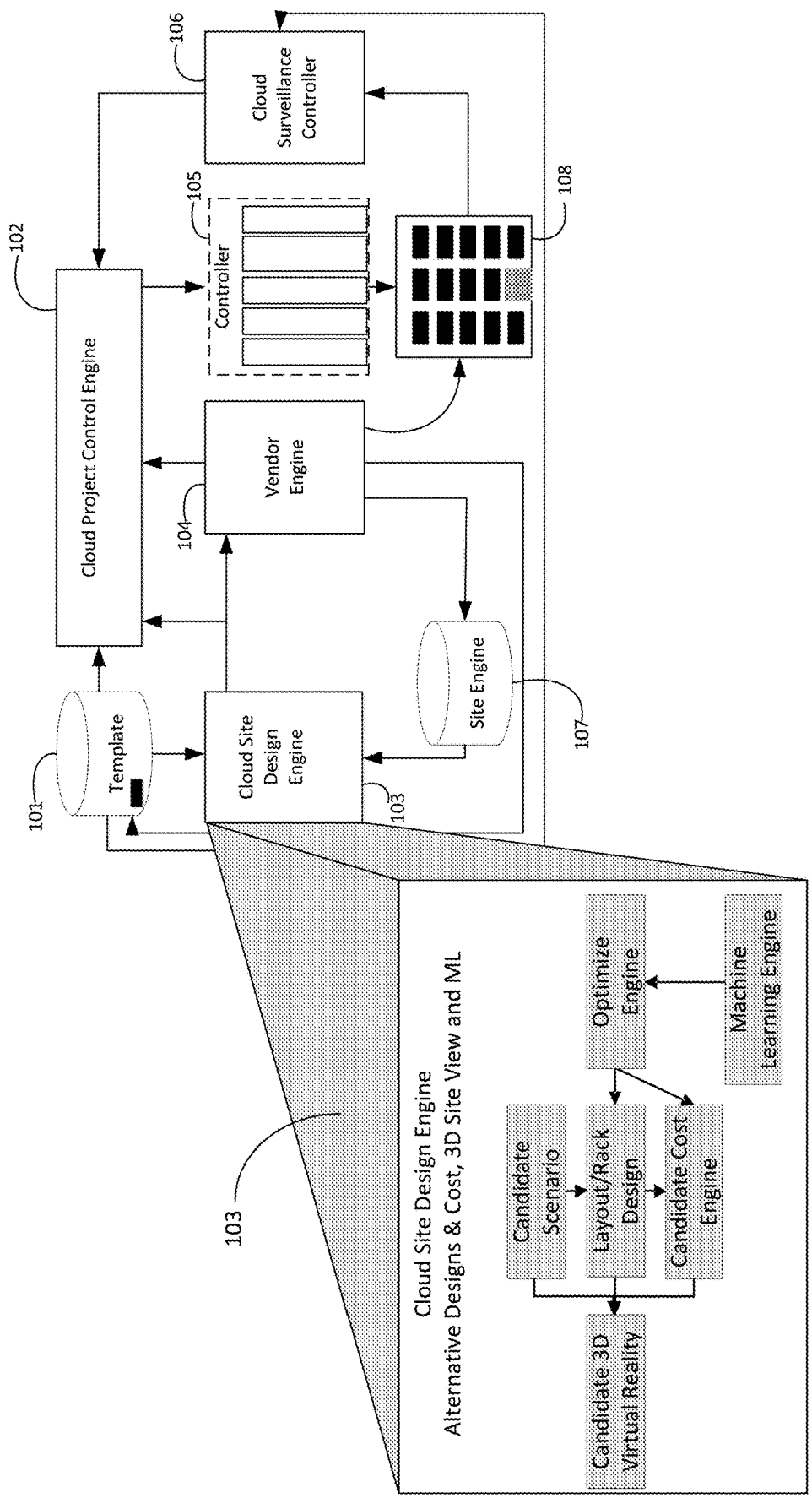
FIG. 3 illustrates exemplary components of an autonomous cloud design system.

FIG. 3 provides more details on cloud site design engine 103 which plays a role in the process of autonomous cloud design and control. Based on system or user input, cloud site design engine 103 may determine candidate scenarios using information from the templates engine 103 (e.g., Catalog). Based on the candidate scenarios, the next step may be to determine their layouts or racks designs (e.g., traditional design and operations, future LI-FI with WPT and Robotics, etc.) using the catalog templates and rules. Once the layout and rack designs have been determined, the cost of each design may be calculated using information from the catalog cost. A Machine Learning component may drive optimization of the candidate solutions (Optimization Engine using Machine Learning enhancing the Layout and Rack designs and cost). The results of the candidate scenarios may be available in 3D Virtual Reality by transforming data from site engine 107, for example.

With continued reference to FIG. 3, the machine learning cycle may include: 1) performing correlation or aggregation on the data collected from template engine 101, site engine 107, controllers, or workflow activities; 2) performing multi-dimensional data analysis, apply unsupervised learning to identify clusters and discover hidden patterns; 3) recommend the optimal choice to the designer, apply policy and rules and incorporate the multi-dimensional data analysis results; 4) provide the rationale of the system analysis for the recommendation, display system decision steps; or 5) update recommendations generation process via reinforcement learning through collecting positive or negative feedbacks from surveys, as well as continuous performance data collection (e.g., errors, throughput, uptime, etc.), which may be post design or construction.

With regard to work flow activities, an example is that a workflow may track activities to turn up a new cloud or addition to an existing cloud—a subset of steps may be: 1) Order equipment; 2) Equipment arrives at site; 3) Equipment Installed and cabled; 4) Load cloud software; 5) Verification test; and 6) Accept a new Cloud instance. With regard to performance data collection, exemplary collected data may include collection (at some interval like 5 minutes) of CPU utilization, memory utilization, or storage utilization, among other things.

Figure 4:
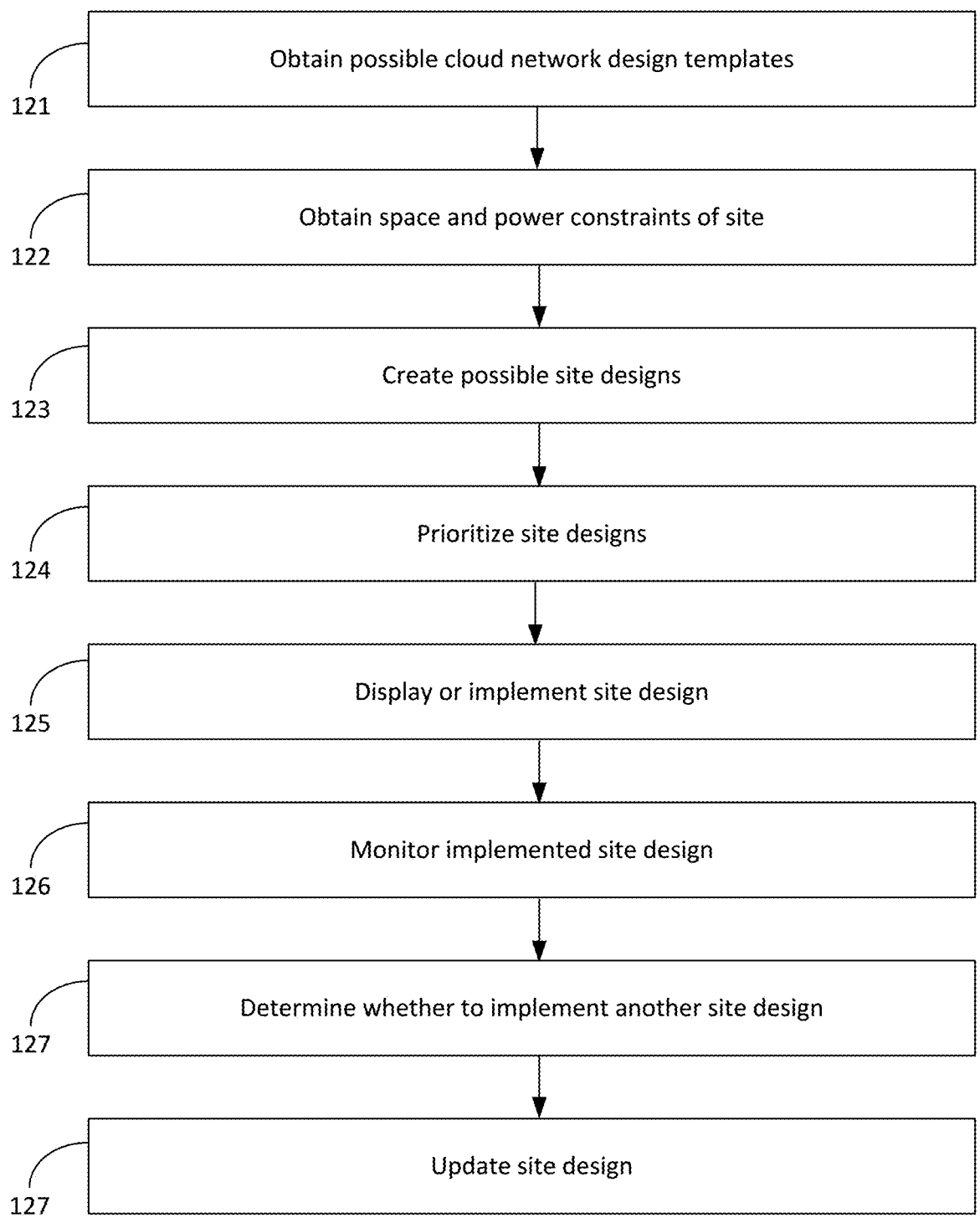
FIG. 4 illustrates an exemplary method for an autonomous cloud design system.

FIG. 4 illustrates an exemplary method for autonomous cloud design system 100. This method may be executed on one device (e.g., a first server) or across a plurality of devices (e.g., a first server and a second server). At step 121, a network design template (e.g., a cloud design template) may be obtained by template engine 101, which may be based on augmentation of an existing site or new site capacity considerations. Template engine 101 may generate the network design template or receive it from an external source. The network design template may be defined as information that describes the interworking of some or all of a network. The network design template may include the following network design template information, such as number of compute resources, type of compute resources, minimum memory, storage type, storage size, leaf switch type, number of leaf switches, spine switch type, or fabric configuration (e.g., frame to leaf, leaf to leaf, leaf to spine, etc.), among other things.

Figure 5:
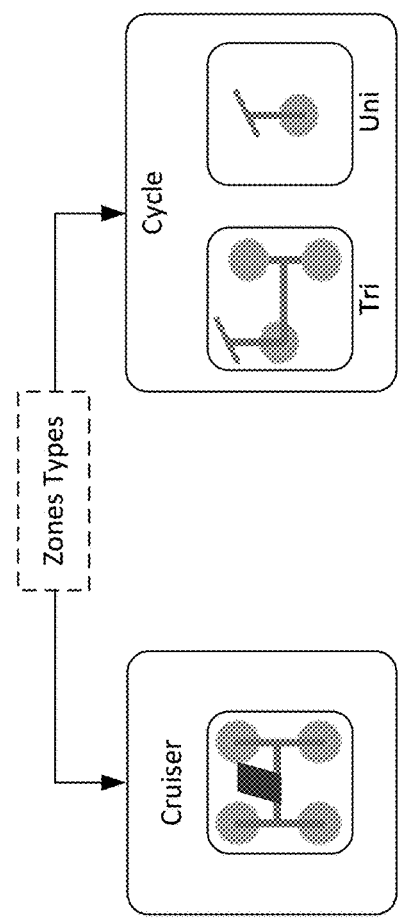
FIG. 5 illustrates exemplary network design template.
Figure 5:
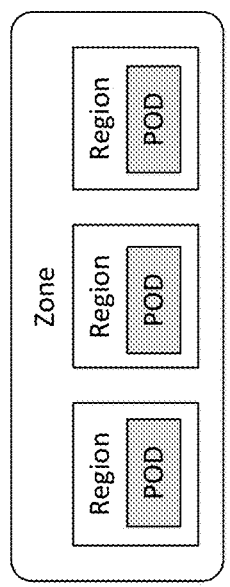
Figure 6:
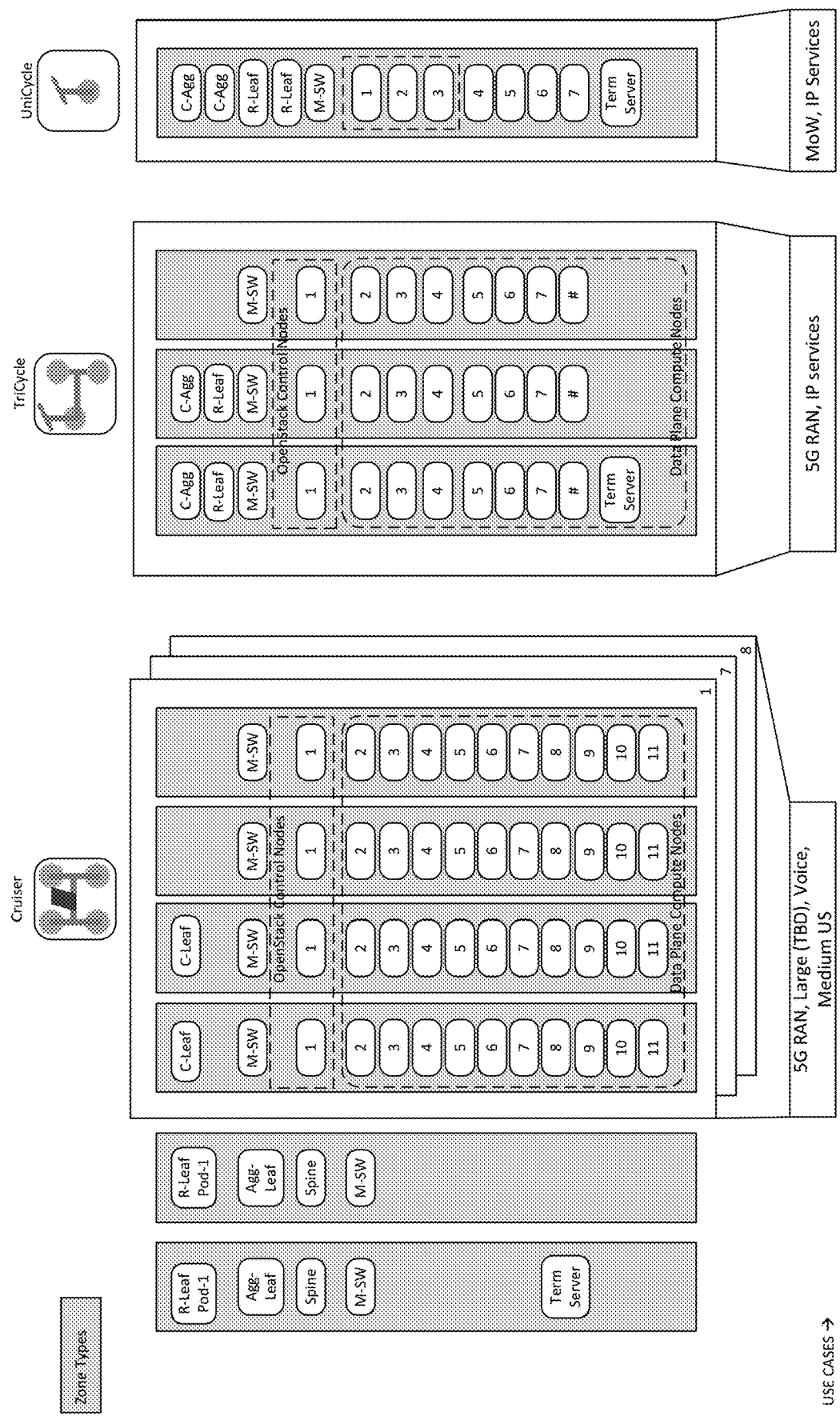
FIG. 6 illustrates exemplary network design template.

FIG. 5 and FIG. 6 provide examples of information that may be used in creating a network design template that may be obtained by template engine 101. As is contemplated herein, information, such as minimum memory, may be determined based on a combination of information (e.g., type of services and processing power of devices performing the services). Discussed below is terminology and lego approach. With reference to FIG. 5, point of deployment (POD) may be for TP&E. POD may be a fixed sized deployment that may reduce blast radius. There may be multiple types of PODs, such as network POD or compute POD. Region may be considered a single instance of Openstack cloud (e.g., 1 compute POD—1 Openstack region). A cloud zone (also referred to as zone) may include a common Network Fabric (e.g., Network POD) shared by one or more cloud Regions (e.g., Compute POD). A network cloud may be considered a cloud software that runs on cloud zone. A site may be considered a geographical location where TP&E deploys one or more cloud zones. Table 1 and Table 2 provides additional exemplary information that may be considered for a network template in view of FIG. 5 and FIG. 6.

TABLE 1

Cycle

Fixed
Combine fabric and computes within single POD
Independent
Multiple Types, such as UniCycle and TriCycle.
UniCycle may be 1 rack, 7 Server POD
TriCycle may be 3 Rack, 24 server POD
Uni Costs -> 250 K, Tri Costs -> 500 k

TABLE 2

Cruiser

Modularly scalable
Minimum 1 cruiser network POD and 1 or
more cruiser compute
A single cruiser-compute-POD may include 4
Racks, 44 Server deployment
A single Cruiser Zone may support 8 compute
PODs - Total 352 servers
Costs may be millions per region/POD At step 122, space and power constraints of a site may be obtained by template engine 101 or site engine 107. Space constraints and power constraints may be constraints associated with data center overall all or particular rooms of a data center. Space constraints may include space information, such as room dimensions, position of power outlets, or position of cooling events, among other things. Power constraints may include power information, such as total available voltage in a room, or number of power outlets that can support network equipment, g other things. Costs associated with space constraints, power constraints, or the information of step 121 may also be obtained. The cost information may include information such as power cost at time of day or cost per square foot of facility, among other things.

Figure 7:
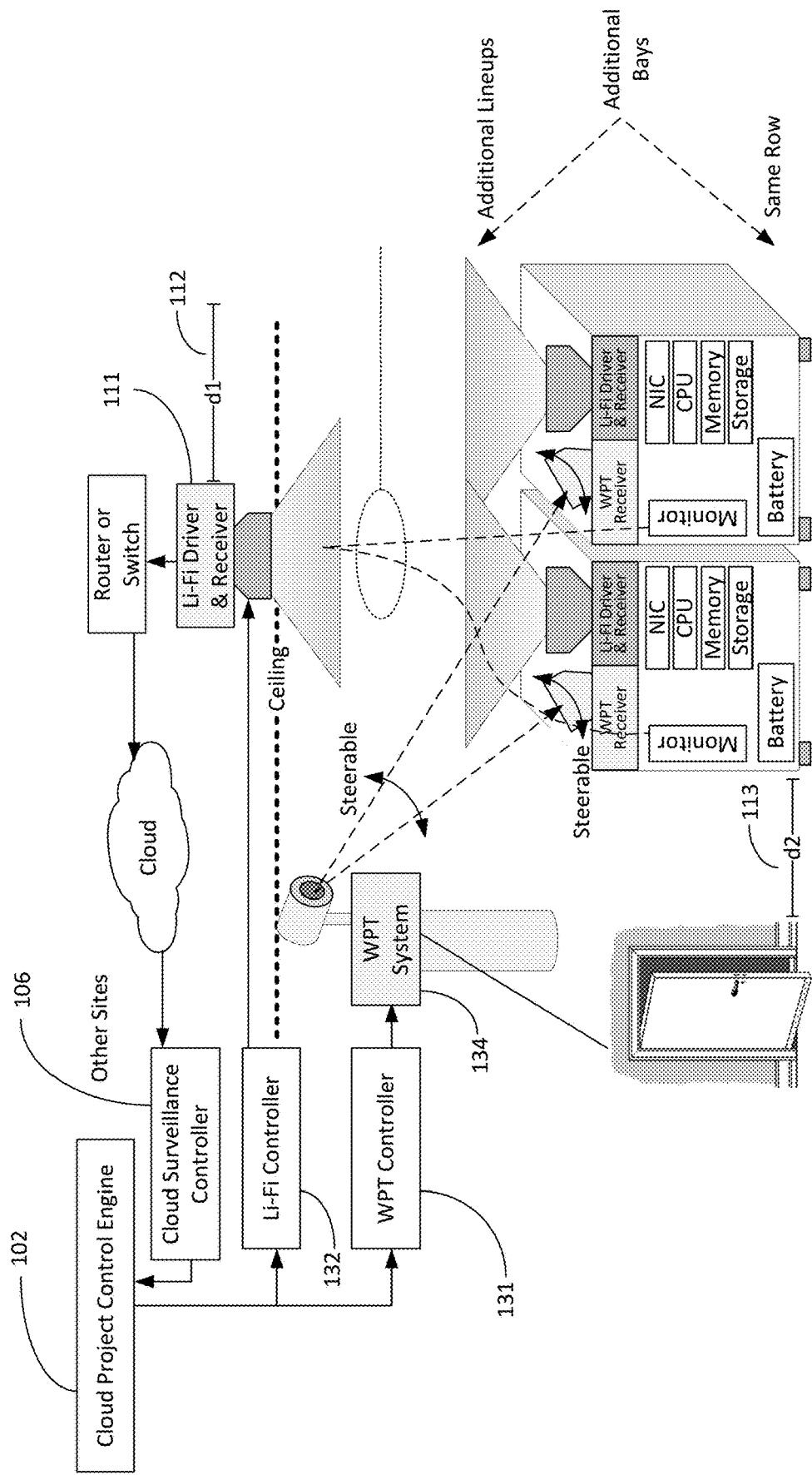
FIG. 7 illustrates an exemplary selected site design.

At step 123, based on the information of step 121 and information of step 122, a site design may be created by cloud site design engine 103. Cloud site design engine 103 may generate various candidate site designs (e.g., permutations of possible configurations that may consider cost, network performance, power usage, or parts availability, among other things), based on the information of step 121 and step 122. In short, the permutations may relate to what would happen if: a) built out as-is (e.g., 25% more capacity with same equipment), b) replace technology (e.g., 25% more capacity with X technology vs. Y technology), Cloud site design engine 103 may compare the various candidate site designs and select one of the various candidate site designs based on the comparison. The comparison may be associated with the cost, network performance, power usage, parts availability in days for predicted outages, or the like. The selected site design may have had the best average, the best median, or reached a threshold number. The selected site design may include information such as position of equipment (e.g., 5 meters from door or GPS coordinate X, Y, Z), connections between equipment, type of equipment, or minimum room temperature, among other things. FIG. 7 illustrates an exemplary selected site design.

Subsequent or simultaneous to step 123, at step 123, one selected site design or a prioritized list of candidate site designs may be created. Herein selected site design or prioritized list of site designs may be used interchangeably. The prioritization may be based on one or more factors, such as upfront implementation cost, implementation time, expected useful life of a technology, or estimated lifetime cost of an implementation, among other things.

Figure 9:
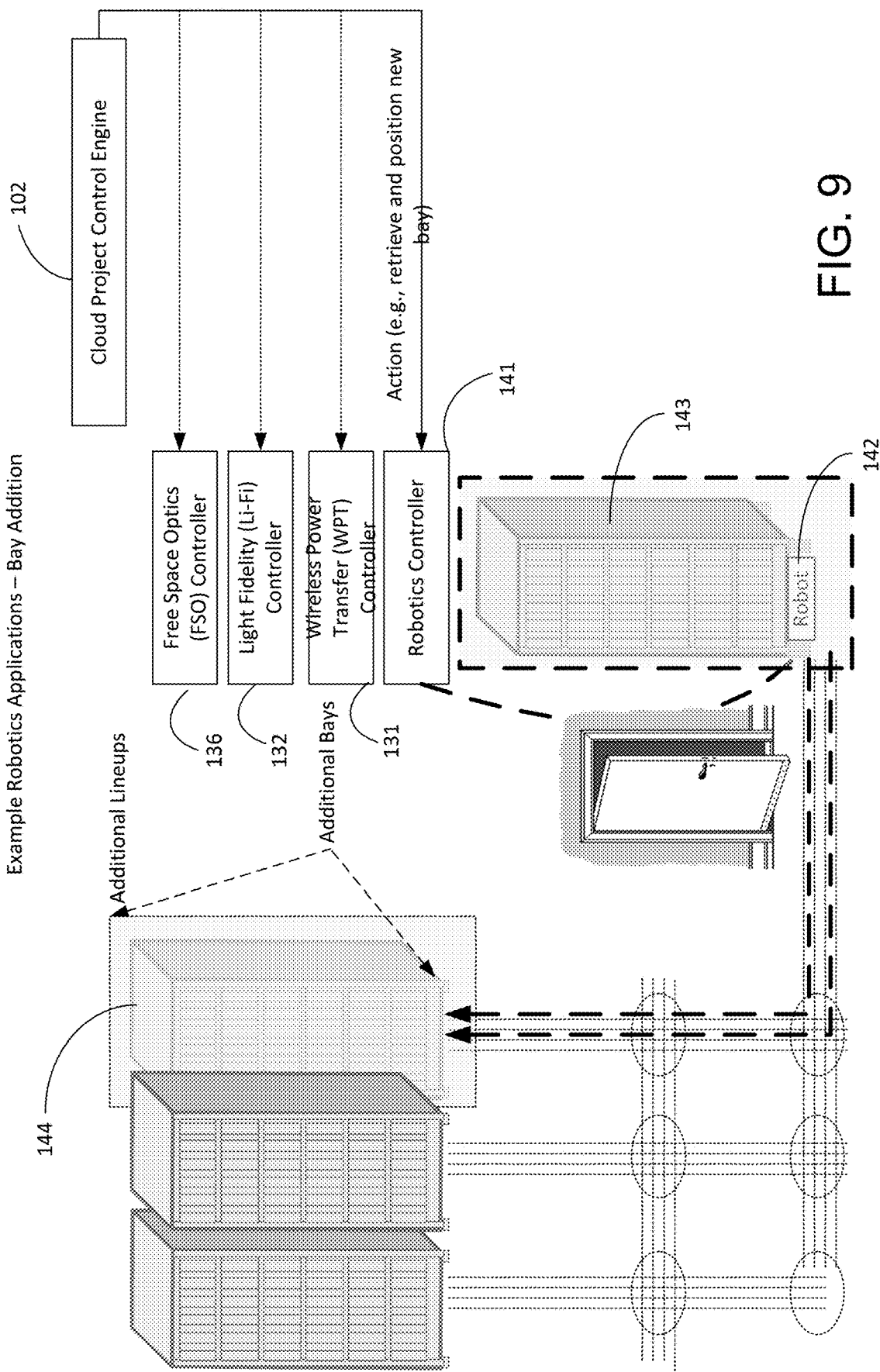
FIG. 9 illustrates an exemplary site design with the use of robotics for placing a new bay in operation.

At step 125, based on the selected site design of step 124, instructions may be provided to 1) display the site design on a device display (e.g., 3D virtual reality); 2) create a 3D printed model of the site design; or 3) instruct devices to implement the validated site design. In an example, with regard to implementation as shown in FIG. 9, cloud project control engine 102 may communicate with robotics controller 141 in order for robot 142 to appropriately position additional bay 143. In an example, the displayed site design (e.g., virtual or model) may include information associated with cost and timeline details or layout and rack configuration, among other things. It is contemplated that a user may validate or choose the site design before any implementation. The site design may be sent to cloud project control engine 102 or vendor engine 104 to trigger site build. Vendor engine 104 may order the equipment from one or more vendors. Vendor engine 104, in addition, may reserve (e.g., order) installer to rack and stack equipment at site or robots could be used, which is discussed in more detail herein. After the equipment is physically installed, cloud project control engine may turn up the installed equipment (e.g., cloud network related equipment), which may be with the assistance of controller framework 105.

At step 126, the implemented site design may be monitored. For example, within a particular time, changes in cost, network performance, power usage, room dimensions, room temperature, or parts availability, among other things may be monitored to determine whether any thresholds are met that would indicate another site design should be generated. At step 127, based on a determination that one or more thresholds are met from step 126, determining a second site design that is within the appropriate thresholds (e.g., performs better) than the currently implemented site design. At step 128, change from the selected site design of step 123 to the second site design of step 127. It is contemplated herein that once the threshold is detected at step 126, then, in summary, step 121-step 125 may be repeated. Disclosed below are additional details that may be associated with the steps of FIG. 4.

As disclosed herein, FIG. 7 illustrates an exemplary site design with Li-Fi data transmission and wireless power transfer (WPT). WPT Laser or mmWave Receive System signal that directly supplies power to the components in the bay or an internal battery or external battery near the equipment. Door switch or other sensor (e.g., heat or motion) detects when a person has opened the door or there is another obstacle and may turn-off the WPT system, redirect or turn-off robots, or turn-off other systems for safety or reduce the likelihood of damage. This system may help maximize space at the site. For data transmission instead of cabled Ethernet or Layer 3 connectivity, the design utilizes Li-Fi unit(s). The Li-Fi Fixtures (which may be integrated in a router or switch) may include both LED light that is modulated and photo-detector (simplified view) that can be focused via a lens. The site design may include measurements such as measurement 112 (e.g., 2 meters) or measurement 113, among others. This site design may be selected in the Cloud Site Design Engine 103 and it may send the site design to the Cloud Project Control Engine 102, as disclosed herein. Cloud Project Control Engine 102 may get the configuration information from templates engine 101. Cloud Project Control Engine 102 may interact with WPT Controller 131 to configure WPT System 134 and to steer and control the power levels to the bays. Cloud project control engine 102 may interact with Li-Fi Controller 132 to establish data transmission between the bays and to the network. Cloud Surveillance Controller 133 may provide status, alerts, or metrics to Cloud Project Control Engine 102 to perform closed-loop control, such as interfacing WPT Controller 131 to re-direct the WPT beam between bays or change power levels (e.g., maintain proper battery charging).

Figure 8:
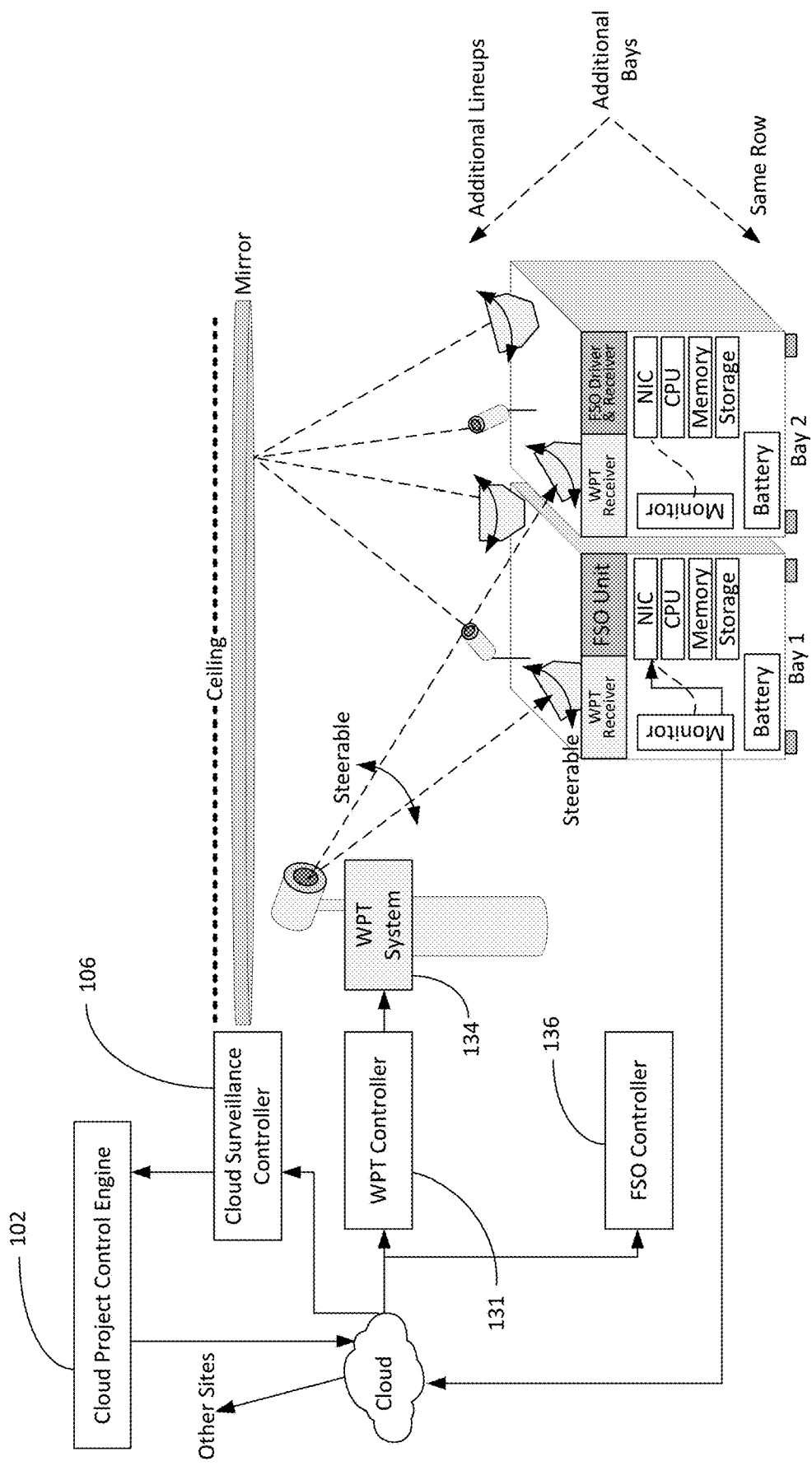
FIG. 8 illustrates an exemplary site design with FSO data transmission and wireless power transfer (WPT)

FIG. 8 illustrates an exemplary site design with FSO data transmission and wireless power transfer (WPT). Here data transmission instead of cabled Ethernet or Layer 3 connectivity, the site design may utilize Free Space Optics (FSO). A mirror may be on the ceiling to reflect beams, as shown. Network connectivity options may include an external physical router, an external physical switch, a virtualized router, or virtualized switch (e.g., virtual provider edge—vPE) in a bay. vPE may be established in the first bay installed and connectivity to other bays established via FSO. As shown, cloud project control engine 102 may interact with the FSO controller 136.

FIG. 9 illustrates an exemplary site design with the use of robotics for placing a new bay in operation. Robotics may be used for on-site automatics support for the power or data transmissions. In an example, first, a vendor may roll a new configured bay to a loading dock. Second, cloud project control engine 102 instructs robotics controller 141 to direct robot 142 to retrieve additional bay 143 (e.g., a new bay) and place it in position 144. The robots may be directed to the appropriate positions using physical tracks (as shown) or via lasers, which may be considered virtual tracks. Cloud project control engine 102 may interact with WPT Controller 131 to power up additional bay 143. Cloud project control engine 102 may interact with the Li-Fi controller 132 or FSO controller 136 to provide connectivity to additional bay 143. In an exemplary scenario, at a first step, cloud surveillance controller 106 may detect circuit pack failure. At a second step, cloud surveillance controller 106 may send an alert to cloud project control engine 102. At a third step, cloud project control engine 102 may instruct robot 142 to direct robot to replace circuit pack. The instructions may include: 1) triggering robot to locate correct circuit pack (e.g., using bar code reader); 2) guiding robot to follow route (e.g., follow physical or virtual tracks); 3) instruct robot to replace circuit pack (e.g., robot climbs to correct shelf); or 4) guiding robot to faulty component bin and place failed circuit in it.

Autonomous cloud design system as disclosed herein may provide for more efficient infrastructure planning and implementation. New technologies (Free Space Optics, Wireless Power Transfer, Light Fidelity) and cheaper battery technologies are major steps to make wired cloud infrastructures a thing of the past. Combined with Botsourcing (robots replacing humans) could lead to human-less Cloud infrastructures and new infrastructure designs. The choices for powering (e.g. traditional design, new AC and emerging battery technologies designs, and innovative approaches on the horizon such as Wireless Power Transfer that could eliminate much of the cabling) provides an opportunity to minimize a key contributor of cloud infrastructure cost while maintaining the cloud reliability. Intra-cloud transmission is another key contributor of cloud infrastructure cost. New approaches that may eliminate cabling (especially inter-bay communications) may include technologies such as Free Space Optics and Light Fidelity. Robotics is another emerging technology that is automating warehouse and it seems the technology may be extended to cloud operations. Botsourcing may open opportunities in rack design and infrastructure approaches since there may be no need for human scale aisles, able to use vertical space (robots climbing frames is possible), and novel approaches such as immersing the architecture in a vat of mineral oil for cooling. In addition, robots can be re-programmed (software upgraded) and controlled by Artificial Intelligence (AI) to further automate the operations in an incremental & ongoing fashion. The autonomous cloud design system as disclosed herein provides a powerful approach to deal with future diversity of site design approaches and yield low total cost of operation, maintenance, and ownership, among other things.

Below are additional information about with regard to considered technologies or designs of the autonomous cloud design system, such as Li-Fi, WPT, FSO, battery location, battery type, or VR, among other things. Light Fidelity (Li-Fi) may be considered a visible light communications system running wireless communications with very high data transfer rates. Li-Fi may use common household LED (light emitting diodes) light bulbs to enable transfer, boasting speeds of up to 224 gigabits per second. Wireless power transfer (WPT) or wireless energy transmission is the transmission of electrical energy from a power source to an electrical load, such as an electrical power grid or a consuming device, without the use of discrete man-made conductors. FSO may be considered optical communication technology that uses light propagating in free space to wirelessly transmit data for telecommunications or computer networking. "Free space" means air, outer space, vacuum, or something similar. This contrasts with using solids such as optical fiber cable. With regard to battery location, moving power processing and reserve "upstairs," with the objective of placing it as close as possible to the load (distributed" power architectures) because of battery and rectifier improvements. DC distribution losses are dramatically reduced and replaced by much smaller AC losses.

Figure 10:
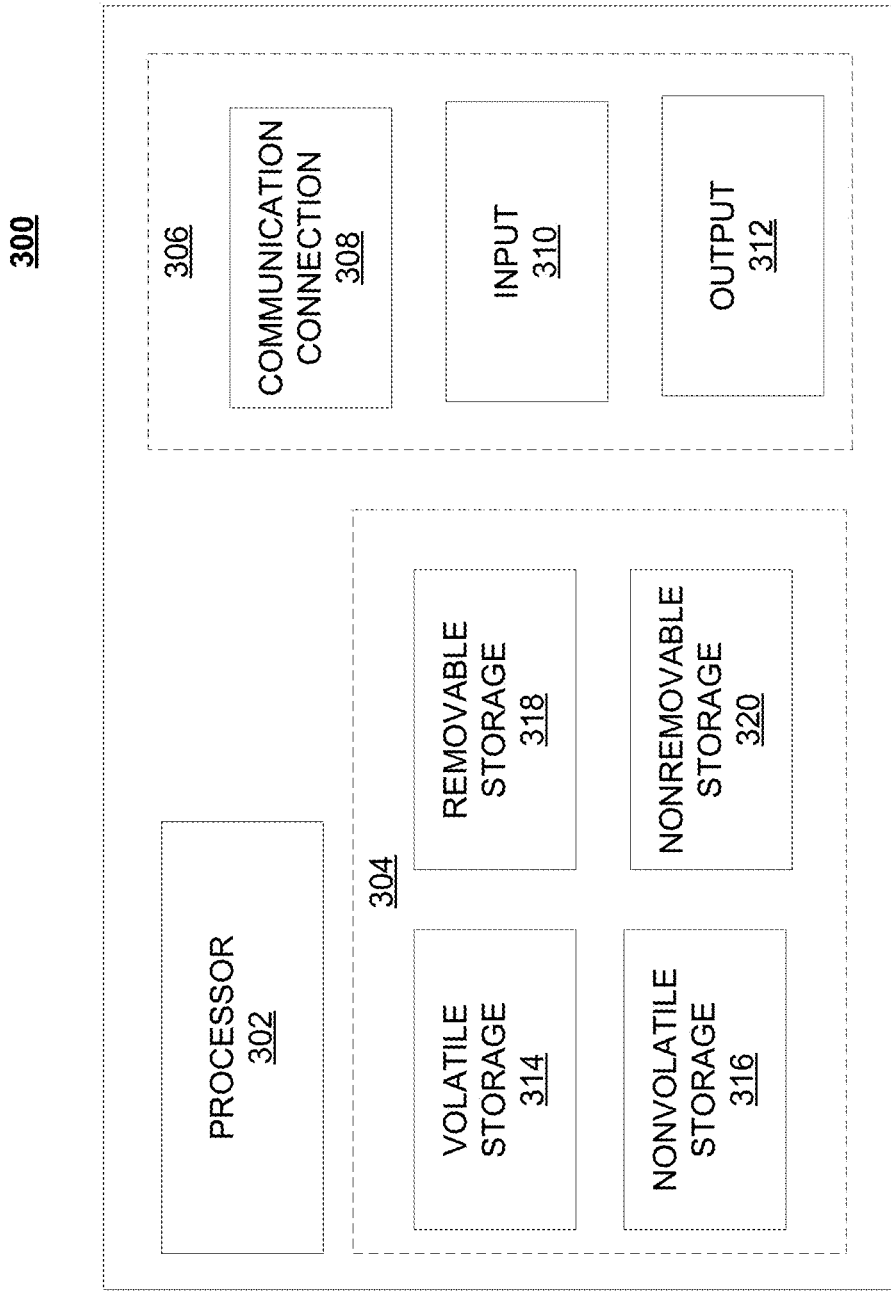
FIG. 10 illustrates a schematic of an exemplary network device.

Reduced distance DC voltage has to travel uses smaller conductors carrying current resulting in CapEx reductions. In further consideration of battery, the price of lithium-ion battery packs could fall by a third the next 10 years (e.g., 2025). Innovations that make use of flow batteries, liquid metal batteries, and other technologies could reduce costs. All-solid-state battery cells could lead to safer, faster-charging, longer-lasting rechargeable batteries FIG. 10 is a block diagram of network device 300 that may be connected to or comprise a component of system 100 or in FIG. 7-FIG. 9, for example. Network device 300 may comprise hardware or a combination of hardware and software. The functionality to facilitate telecommunications via a telecommunications network may reside in one or combination of network devices 300. Network device 300 depicted in FIG. 10 may represent or perform functionality of an appropriate network device 300, or combination of network devices 300, such as, for example, a component or various components of a cellular broadcast system wireless network, a processor, a server, a gateway, a node, a mobile switching center (MSC), a short message service center (SMSC), an automatic location function server (ALFS), a gateway mobile location center (GMLC), a radio access network (RAN), a serving mobile location center (SMLC), or the like, or any appropriate combination thereof. It is emphasized that the block diagram depicted in FIG. 10 is exemplary and not intended to imply a limitation to a specific implementation or configuration. Thus, network device 300 may be implemented in a single device or multiple devices (e.g., single server or multiple servers, single gateway or multiple gateways, single controller or multiple controllers). Multiple network entities may be distributed or centrally located. Multiple network entities may communicate wirelessly, via hard wire, or any appropriate combination thereof.

Network device 300 may comprise a processor 302 and a memory 304 coupled to processor 302. Memory 304 may contain executable instructions that, when executed by processor 302, cause processor 302 to effectuate operations associated with mapping wireless signal strength. As evident from the description herein, network device 300 is not to be construed as software per se.

In addition to processor 302 and memory 304, network device 300 may include an input/output system 306. Processor 302, memory 304, and input/output system 306 may be coupled together (coupling not shown in FIG. 10) to allow communications between them. Each portion of network device 300 may comprise circuitry for performing functions associated with each respective portion. Thus, each portion may comprise hardware, or a combination of hardware and software. Accordingly, each portion of network device 300 is not to be construed as software per se. Input/output system 306 may be capable of receiving or providing information from or to a communications device or other network entities configured for telecommunications. For example input/output system 306 may include a wireless communications (e.g., 3G/4G/GPS) card. Input/output system 306 may be capable of receiving or sending video information, audio information, control information, image information, data, or any combination thereof. Input/output system 306 may be capable of transferring information with network device 300. In various configurations, input/output system 306 may receive or provide information via any appropriate means, such as, for example, optical means (e.g., infrared), electromagnetic means (e.g., RF, Wi-Fi, Bluetooth®, ZigBee®), acoustic means (e.g., speaker, microphone, ultrasonic receiver, ultrasonic transmitter), or a combination thereof. In an example configuration, input/output system 306 may comprise a Wi-Fi finder, a two-way GPS chipset or equivalent, or the like, or a combination thereof.

Input/output system 306 of network device 300 also may contain a communication connection 308 that allows network device 300 to communicate with other devices, network entities, or the like. Communication connection 308 may comprise communication media. Communication media typically embody computer-readable instructions, data structures, program modules or other data in a modulated data signal such as a carrier wave or other transport mechanism and includes any information delivery media. By way of example, and not limitation, communication media may include wired media such as a wired network or direct-wired connection, or wireless media such as acoustic, RF, infrared, or other wireless media. The term computer-readable media as used herein includes both storage media and communication media. Input/output system 306 also may include an input device 310 such as keyboard, mouse, pen, voice input device, or touch input device. Input/output system 306 may also include an output device 312, such as a display, speakers, or a printer.

Processor 302 may be capable of performing functions associated with telecommunications, such as functions for processing broadcast messages, as described herein. For example, processor 302 may be capable of, in conjunction with any other portion of network device 300, determining a type of broadcast message and acting according to the broadcast message type or content, as described herein.

Memory 304 of network device 300 may comprise a storage medium having a concrete, tangible, physical structure. As is known, a signal does not have a concrete, tangible, physical structure. Memory 304, as well as any computer-readable storage medium described herein, is not to be construed as a signal. Memory 304, as well as any computer-readable storage medium described herein, is not to be construed as a transient signal. Memory 304, as well as any computer-readable storage medium described herein, is not to be construed as a propagating signal. Memory 304, as well as any computer-readable storage medium described herein, is to be construed as an article of manufacture.

Memory 304 may store any information utilized in conjunction with telecommunications. Depending upon the exact configuration or type of processor, memory 304 may include a volatile storage 314 (such as some types of RAM), a nonvolatile storage 316 (such as ROM, flash memory), or a combination thereof. Memory 304 may include additional storage (e.g., a removable storage 318 or a non-removable storage 320) including, for example, tape, flash memory, smart cards, CD-ROM, DVD, or other optical storage, magnetic cassettes, magnetic tape, magnetic disk storage or other magnetic storage devices, USB-compatible memory, or any other medium that can be used to store information and that can be accessed by network device 300. Memory 304 may comprise executable instructions that, when executed by processor 302, cause processor 302 to effectuate operations to map signal strengths in an area of interest.

Figure 11:
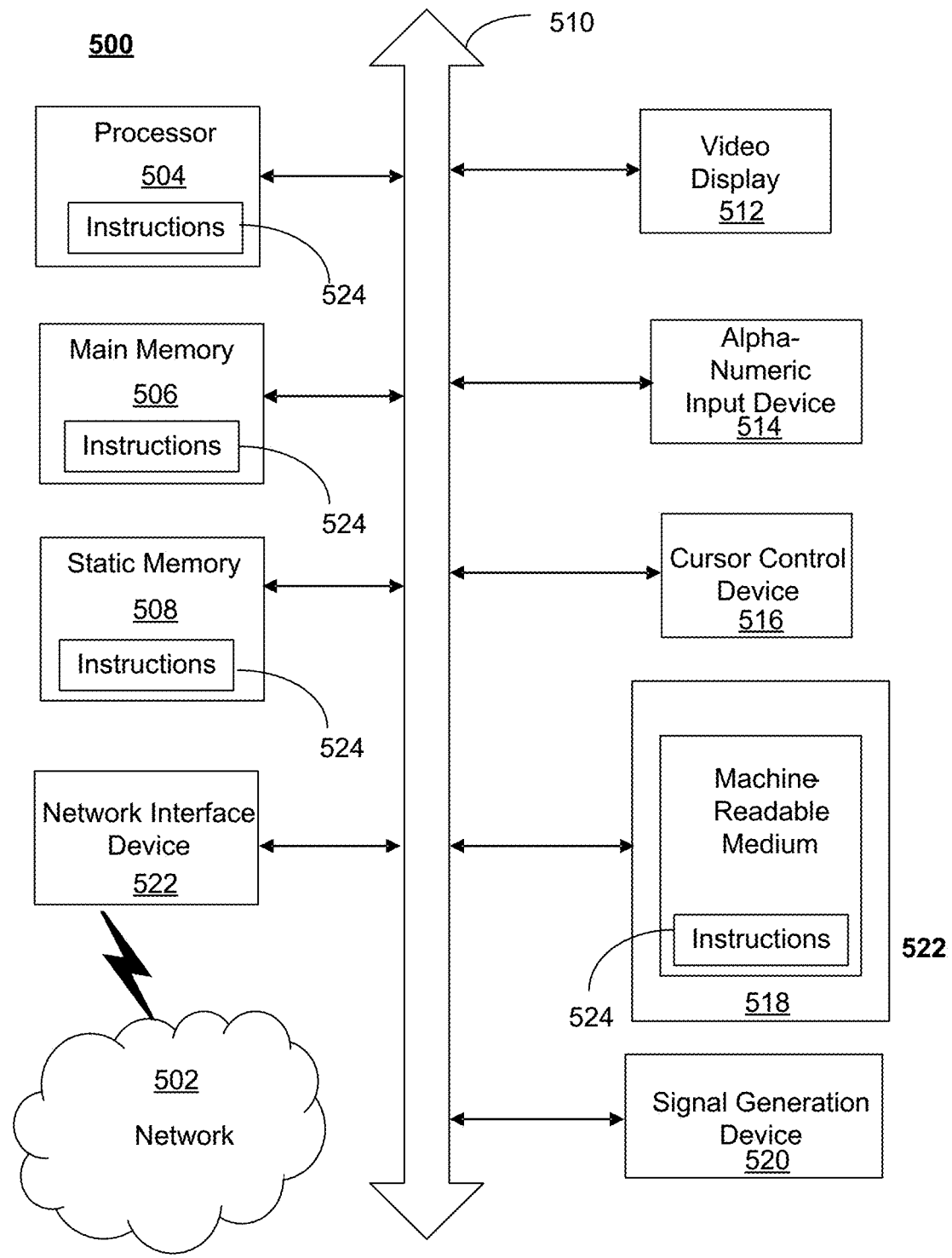
FIG. 11 illustrates an exemplary communication system that provides wireless telecommunication services over wireless communication networks.

FIG. 11 depicts an exemplary diagrammatic representation of a machine in the form of a computer system 500 within which a set of instructions, when executed, may cause the machine to perform any one or more of the methods described above. One or more instances of the machine can operate, for example, as processor 302, robot 142, WPT controller 131, FSO controller 136, and other devices of FIG. 2, FIG. 7-FIG. 9, and FIG. 10. In some examples, the machine may be connected (e.g., using a network 502) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

Computer system 500 may include a processor (or controller) 504 (e.g., a central processing unit (CPU)), a graphics processing unit (GPU, or both), a main memory 506 and a static memory 508, which communicate with each other via a bus 510. The computer system 500 may further include a display unit 512 (e.g., a liquid crystal display (LCD), a flat panel, or a solid state display). Computer system 500 may include an input device 514 (e.g., a keyboard), a cursor control device 516 (e.g., a mouse), a disk drive unit 518, a signal generation device 520 (e.g., a speaker or remote control) and a network interface device 522. In distributed environments, the embodiments described in the subject disclosure can be adapted to utilize multiple display units 512 controlled by two or more computer systems 500. In this configuration, presentations described by the subject disclosure may in part be shown in a first of display units 512, while the remaining portion is presented in a second of display units 512.

The disk drive unit 518 may include a tangible computer-readable storage medium 524 on which is stored one or more sets of instructions (e.g., software 526) embodying any one or more of the methods or functions described herein, including those methods illustrated above. Instructions 526 may also reside, completely or at least partially, within main memory 506, static memory 508, or within processor 504 during execution thereof by the computer system 500. Main memory 506 and processor 504 also may constitute tangible computer-readable storage media.

As shown in FIG. 13, telecommunication system 600 may include wireless transmit/receive units (WTRUs) 602, a RAN 604, a core network 606, a public switched telephone network (PSTN) 608, the Internet 610, or other networks 612, though it will be appreciated that the disclosed examples contemplate any number of WTRUs, base stations, networks, or network elements. Each WTRU 602 may be any type of device configured to operate or communicate in a wireless environment. For example, a WTRU may comprise robot 142, equipment 108, network device 300, or the like, or any combination thereof. By way of example, WTRUs 602 may be configured to transmit or receive wireless signals and may include a UE, a mobile station, a fixed or mobile subscriber unit, a pager, a cellular telephone, a PDA, a smartphone, a laptop, a netbook, a personal computer, a wireless sensor, consumer electronics, or the like. It is understood that the exemplary devices above may overlap in their functionality and the terms are not necessarily mutually exclusive. WTRUs 602 may be configured to transmit or receive wireless signals over an air interface 614.

Telecommunication system 600 may also include one or more base stations 616. Each of base stations 616 may be any type of device configured to wirelessly interface with at least one of the WTRUs 602 to facilitate access to one or more communication networks, such as core network 606, PTSN 608, Internet 610, or other networks 612. By way of example, base stations 616 may be a base transceiver station (BTS), a Node-B, an eNode B, a Home Node B, a Home eNode B, a site controller, an access point (AP), a wireless router, or the like. While base stations 616 are each depicted as a single element, it will be appreciated that base stations 616 may include any number of interconnected base stations or network elements.

RAN 604 may include one or more base stations 616, along with other network elements (not shown), such as a base station controller (BSC), a radio network controller (RNC), or relay nodes. One or more base stations 616 may be configured to transmit or receive wireless signals within a particular geographic region, which may be referred to as a cell (not shown). The cell may further be divided into cell sectors. For example, the cell associated with base station 616 may be divided into three sectors such that base station 616 may include three transceivers: one for each sector of the cell. In another example, base station 616 may employ multiple-input multiple-output (MIMO) technology and, therefore, may utilize multiple transceivers for each sector of the cell.

Base stations 616 may communicate with one or more of WTRUs 602 over air interface 614, which may be any suitable wireless communication link (e.g., RF, microwave, infrared (IR), ultraviolet (UV), or visible light). Air interface 614 may be established using any suitable radio access technology (RAT).

As an example base station 616 and WTRUs 602 that are connected to RAN 604 may implement a radio technology such as Evolved UMTS Terrestrial Radio Access (E-UTRA), which may establish air interface 614 using LTE or LTE-Advanced (LTE-A).

Figure 12:
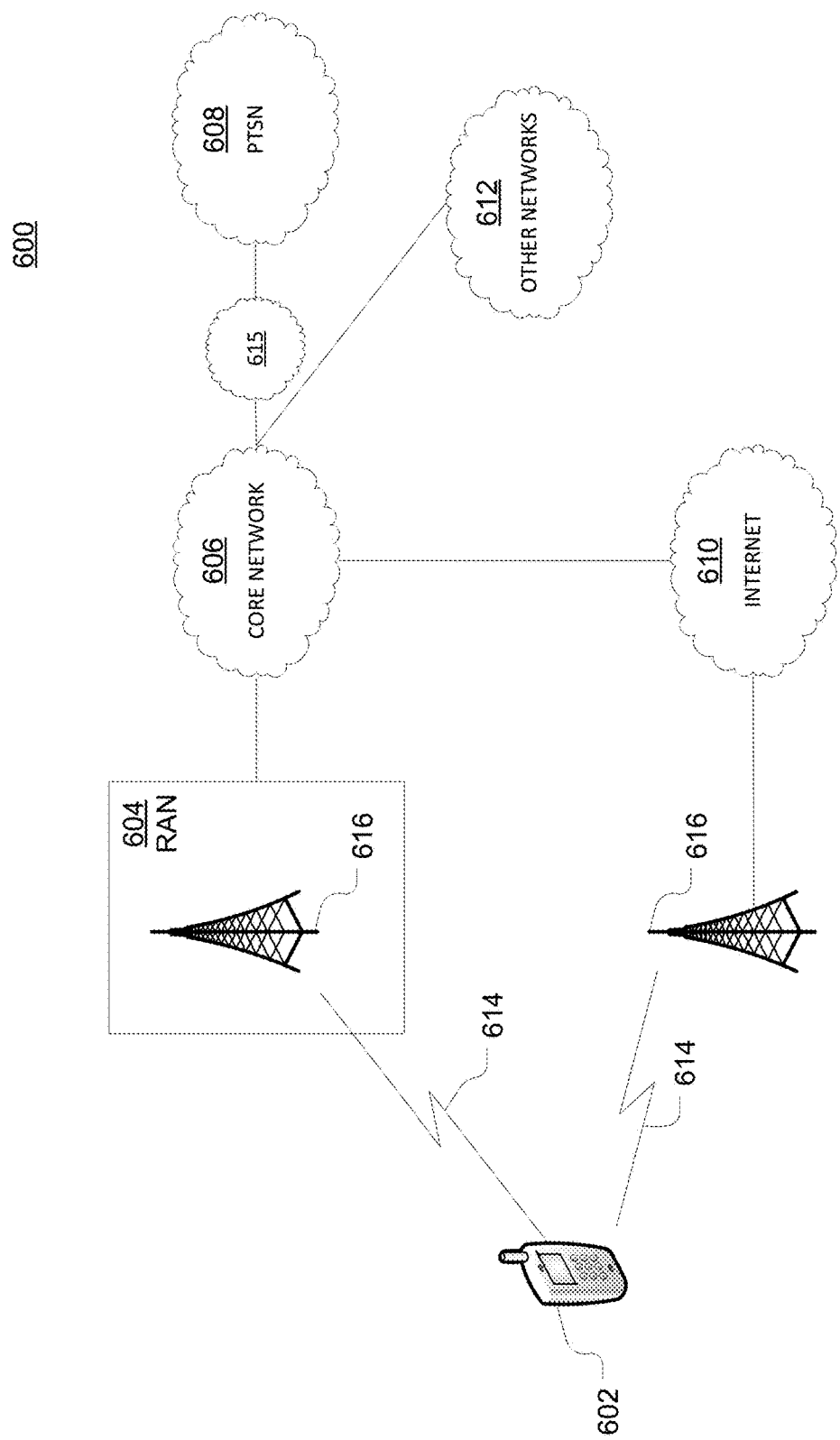
FIG. 12 illustrates an exemplary telecommunications system in which the disclosed methods and processes may be implemented.

Base station 616 may be a wireless router, Home Node B, Home eNode B, gNode B or access point, for example, and may utilize any suitable RAT for facilitating wireless connectivity in a localized area, such as a place of business, a home, a vehicle, a campus, or the like. For example, base station 616 and associated WTRUs 602 may implement a radio technology such as IEEE 602.11 to establish a wireless local area network (WLAN). As another example, base station 616 and associated WTRUs 602 may implement a radio technology such as IEEE 602.15 to establish a wireless personal area network (WPAN). In yet another example, base station 616 and associated WTRUs 602 may utilize a cellular-based RAT (e.g., WCDMA, CDMA2000, GSM, LTE, LTE-A, 5G (e.g., new radio) etc.) to establish a picocell or femtocell. As shown in FIG. 12, base station 616 may have a direct connection to Internet 610. Thus, base station 616 may not be required to access Internet 610 via core network 606.

RAN 604 may be in communication with core network 606, which may be any type of network configured to provide voice, data, applications, and/or voice over internet protocol (VoIP) services to one or more WTRUs 602. For example, core network 606 may provide call control, billing services, mobile location-based services, pre-paid calling, Internet connectivity, video distribution or high-level security functions, such as user authentication. Although not shown in FIG. 12, it will be appreciated that RAN 604 or core network 606 may be in direct or indirect communication with other RANs that employ the same RAT as RAN 604 or a different RAT. For example, in addition to being connected to RAN 604, which may be utilizing an E-UTRA radio technology, core network 606 may also be in communication with another RAN (not shown) employing a GSM radio technology.

Core network 606 may also serve as a gateway for WTRUs 602 to access PSTN 608, Internet 610, or other networks 612. PSTN 608 may include circuit-switched telephone networks that provide plain old telephone service (POTS). For LTE core networks, core network 606 may use IMS core 615 to provide access to PSTN 608. Internet 610 may include a global system of interconnected computer networks or devices that use common communication protocols, such as the transmission control protocol (TCP), user datagram protocol (UDP), or IP in the TCP/IP internet protocol suite. Other networks 612 may include wired or wireless communications networks owned or operated by other service providers. For example, other networks 612 may include another core network connected to one or more RANs, which may employ the same RAT as RAN 604 or a different RAT.

Some or all WTRUs 602 in telecommunication system 600 may include multi-mode capabilities. That is, WTRUs 602 may include multiple transceivers for communicating with different wireless networks over different wireless links. For example, one or more WTRUs 602 may be configured to communicate with base station 616, which may employ a cellular-based radio technology, and with base station 616, which may employ an IEEE 802 radio technology.

As described herein, a telecommunications system wherein management and control utilizing a software designed network (SDN) and a simple IP are based, at least in part, on user equipment, may provide a wireless management and control framework that enables common wireless management and control, such as mobility management, radio resource management, QoS, load balancing, etc., across many wireless technologies, e.g. LTE, Wi-Fi, and future 5G access technologies; decoupling the mobility control from data planes to let them evolve and scale independently; reducing network state maintained in the network based on user equipment types to reduce network cost and allow massive scale; shortening cycle time and improving network upgradability; flexibility in creating end-to-end services based on types of user equipment and applications, thus improve customer experience; or improving user equipment power efficiency and battery life—especially for simple M2M devices—through enhanced wireless management.

While examples of a telecommunications system in which autonomous cloud design system can be processed and managed have been described in connection with various computing devices/processors, the underlying concepts may be applied to any computing device, processor, or system capable of facilitating a telecommunications system. The various techniques described herein may be implemented in connection with hardware or software or, where appropriate, with a combination of both. Thus, the methods and devices may take the form of program code (i.e., instructions) embodied in concrete, tangible, storage media having a concrete, tangible, physical structure. Examples of tangible storage media include floppy diskettes, CD-ROMs, DVDs, hard drives, or any other tangible machine-readable storage medium (computer-readable storage medium). Thus, a computer-readable storage medium is not a signal. A computer-readable storage medium is not a transient signal. Further, a computer-readable storage medium is not a propagating signal. A computer-readable storage medium as described herein is an article of manufacture. When the program code is loaded into and executed by a machine, such as a computer, the machine becomes an device for telecommunications. In the case of program code execution on programmable computers, the computing device will generally include a processor, a storage medium readable by the processor (including volatile or nonvolatile memory or storage elements), at least one input device, and at least one output device. The program(s) can be implemented in assembly or machine language, if desired. The language can be a compiled or interpreted language, and may be combined with hardware implementations.

The methods and devices associated with a telecommunications system as described herein also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an device for implementing telecommunications as described herein. When implemented on a general-purpose processor, the program code combines with the processor to provide a unique device that operates to invoke the functionality of a telecommunications system.

While a telecommunications system has been described in connection with the various examples of the various figures, it is to be understood that other similar implementations may be used or modifications and additions may be made to the described examples of a telecommunications system without deviating therefrom. For example, one skilled in the art will recognize that a telecommunications system as described in the instant application may apply to any environment, whether wired or wireless, and may be applied to any number of such devices connected via a communications network and interacting across the network. Therefore, a telecommunications system as described herein should not be limited to any single example, but rather should be construed in breadth and scope in accordance with the appended claims.

In describing preferred methods, systems, or apparatuses of the subject matter of the present disclosure—autonomous cloud design system—as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose. In addition, the use of the word "or" is generally used inclusively unless otherwise provided herein.

This written description uses examples to enable any person skilled in the art to practice the claimed invention, including making and using any devices or systems and performing any incorporated methods. The patentable scope of the invention is defined by the claims, and may include other examples that occur to those skilled in the art (e.g., skipping steps, combining steps, or adding steps between exemplary methods disclosed herein). For example, the functions performed in FIG. 4. Such other examples are intended to be within the scope of the claims if they have structural elements that do not differ from the literal language of the claims, or if they include equivalent structural elements with insubstantial differences from the literal languages of the claims.

A method, system, or apparatus for an autonomous cloud design system may obtain a network design template; obtain space and power constraints of a site; based on the network design template, space constraints, and power constraints, create a plurality of candidate site designs; based on a first site design of the plurality of candidate site designs being within a threshold cost or performance (e.g., milliseconds response, processor utilization), selecting the first site design; and sending instructions to automatically implement the first site design. It is contemplated that there may be an automatic creation of 3D models based site designs being within a threshold level of cost or other factors (e.g., information) disclosed herein. Method, system, or apparatus for an autonomous cloud design system may include monitoring a site that has the first site design implemented; updating the network design template to an updated network design template; based on the monitoring, determining that a performance of the site is below a first performance threshold; and based the determining that the performance of the site is below the first performance threshold, generating a second site design based on the updated network design template. The first site design may be automatically implemented by laser-guided robots. The performance threshold may be based on amount of errors within a period or other factors. All combinations in this paragraph and throughout are contemplated herein.

What is claimed:

1. A server comprising:
   a processor; and
   a memory coupled with the processor, the memory comprising executable instructions that when executed by the processor facilitate performance of operations comprising:
   obtaining a network design template;
   obtaining space and power constraints for use in design of a network site, wherein the network design template is provided by a template engine in communication with the processor, wherein the template engine obtains definitions of network faults and actions, the actions including a closed loop control procedure to resolve at least one of the network faults;
   based on the network design template, space constraints, and power constraints, creating a plurality of candidate site designs based on a machine learning cycle that optimizes design options used to create the plurality of candidate site designs;
   based on a first site design of the plurality of candidate site designs being within a threshold cost, selecting the first site design, wherein the threshold cost comprises cost information for a power cost and wherein the threshold cost is a determined maximum power cost to operate the network in accordance with the first site design;
   sending instructions to automatically implement the first site design by initiating an automated site build plan, the initiating based on a predetermined trigger, resulting in a first site;
   monitoring the first site;
   determining that a first performance of the first site is below a performance threshold;
   based on the determining, automatically generating a second site design; and
   determining that the second site design provides a second performance meeting the performance threshold.

2. The server of claim 1, the operations further comprising:
   updating the network design template to an updated network design template,
   wherein the second site design is based on the updated network design template.

3. The server of claim 2, wherein the performance threshold may be based on amount of errors within a period.

4. The server of claim 1, wherein the network design template further comprises leaf switch type or number of leaf switches.

5. The server of claim 1, the operations further comprising based on the first site design of the plurality of candidate site designs being within the threshold cost, providing instructions to generate a 3D generated model of the first site design.

6. The server of claim 1, the operations further comprising displaying an interactive 3D virtual model of the first site design.

7. The server of claim 1, wherein the machine learning cycle improves creating the plurality of candidate site designs using previous site installation information and technology cost trend information.

8. A method comprising:
   obtaining, by a processing system including a processor, a network design template;
   obtaining, by the processing system, space and power constraints for use in design of a network site, wherein the network design template is provided by a template engine in communication with the processing system, wherein the template engine obtains definitions of network faults and actions, the actions including a closed loop control procedure to resolve at least one of the network faults;
   based on the network design template, space constraints, and power constraints, creating, by the processing system, a plurality of candidate site designs based on a machine learning cycle that optimizes design options used to create the plurality of candidate site designs;
   based on a first site design of the plurality of candidate site designs being within a threshold cost, selecting, by the processing system, the first site design, wherein the threshold cost comprises cost information for a power cost, and wherein the threshold cost is a determined maximum power cost to operate the network in accordance with the first site design;
   sending, by the processing system, instructions to automatically implement the first site design by initiating an automated site build plan, the initiating based on a predetermined trigger, resulting in a first site;
   monitoring, by the processing system, the first site;
   determining, by the processing system, that a first performance of the first site is below a performance threshold;
   automatically generating, by the processing system based on the determining, a second site design; and
   determining, by the processing system, that the second site design provides a second performance meeting the performance threshold.

9. The method of claim 8, further comprising:
   updating, by the processing system, the network design template to an updated network design template,
   wherein the second site design is based on the updated network design template.

10. The method of claim 9, wherein the performance threshold may be based on amount of errors within a period.

11. The method of claim 8, wherein the network design template comprises number of compute resources or type of compute resources.

12. The method of claim 8, wherein the network design template comprises number of leaf switches.

13. The method of claim 8, further comprising:

based on the first site design of the plurality of candidate site designs being within the threshold cost, providing, by the processing system, instructions to generate a 3D generated model of the first site design.

14. The method of claim 8, further comprising displaying, by the processing system, an interactive 3D virtual model of the first site design.

15. A non-transitory machine-readable medium comprising executable instructions that, when executed by a processing system including a processor, facilitate performance of operations comprising:

obtaining a network design template;

obtaining space and power constraints for use in designing a network site, wherein the network design template is provided by a template engine in communication with the processing system, wherein the template engine obtains definitions of network faults and actions, the actions including a closed loop control procedure to resolve at least one of the network faults;

based on the network design template, space constraints, and power constraints, creating a plurality of candidate site designs based on a machine learning cycle that optimizes design options used to create the plurality of candidate site designs;

based on a first site design of the plurality of candidate site designs being within a threshold cost, selecting the first site design, wherein the threshold cost is a determined maximum power cost to operate the network in accordance with the first site design;

sending instructions to automatically implement the first site design by initiating an automated site build plan, the initiating based on a predetermined trigger, resulting in a first site;

monitoring the first site;

determining that a first performance of the first site is below a performance threshold;

based on the determining, automatically generating a second site design; and determining that the second site design provides a second performance meeting the performance threshold.

16. The non-transitory machine-readable medium of claim 15, the operations further comprising:

updating the network design template to an updated network design template, wherein the performance threshold may be based on amount of errors within a period, and wherein the second site design is based on the updated network design template.

17. The non-transitory machine-readable medium of claim 15, wherein the network design template comprises type of compute resources.

18. The non-transitory machine-readable medium of claim 15, wherein the network design template comprises leaf switch type or number of leaf switches.

19. The non-transitory machine-readable medium of claim 15, the operations further comprising based on the first site design of the plurality of candidate site designs being within the threshold cost, providing instructions to generate a 3D generated model of the first site design.

20. The non-transitory machine-readable medium of claim 15, the operations further comprising displaying an interactive 3D virtual model of the first site design.

\* \* \* \* \*